United States Patent [19]
Banker et al.

[11] Patent Number: 5,247,364
[45] Date of Patent: Sep. 21, 1993

[54] METHOD AND APPARATUS FOR TUNING DATA CHANNELS IN A SUBSCRIPTION TELEVISION SYSTEM HAVING IN-BAND DATA TRANSMISSIONS

[75] Inventors: Robert O. Banker, Cumming; Kinney C. Bacon, Lawrenceville; Julius B. Bagley, Marietta, all of Ga.

[73] Assignee: Scientific-Atlanta, Inc., Norcross, Ga.

[21] Appl. No.: 800,241

[22] Filed: Nov. 29, 1991

[51] Int. Cl.⁵ .............................. H04N 5/50
[52] U.S. Cl. ......................... 358/191.1; 358/86; 358/188; 455/4.2
[58] Field of Search ............ 358/191.1, 194.1, 188, 358/189, 86; 455/4.2, 5.1, 6.1

[56] References Cited

U.S. PATENT DOCUMENTS

| | | | |
|---|---|---|---|
| 4,626,892 | 12/1986 | Nortrup | 358/188 |
| 4,991,011 | 2/1991 | Johnson | 358/86 |
| 5,019,910 | 5/1991 | Filmer | 358/188 |
| 5,034,820 | 7/1991 | Cho | 358/191.1 |
| 5,045,947 | 9/1991 | Beery | 358/191.1 |

Primary Examiner—John K. Peng
Assistant Examiner—Sherrie Hsia
Attorney, Agent, or Firm—William A. Marvin; Frederick W. Powers, III

[57] ABSTRACT

A subscriber terminal apparatus for a television in an in-band subscription television system is provided. The subscriber terminal is adapted to receive a television signal including video, audio, and data information. A tuner of the subscriber terminal tunes channels of the television signal and an on-screen display control circuit selectively provides a display of characters on the television. A tuner control tunes the tuner to a channel having in-band data when the display of characters is provided on the television.

8 Claims, 12 Drawing Sheets

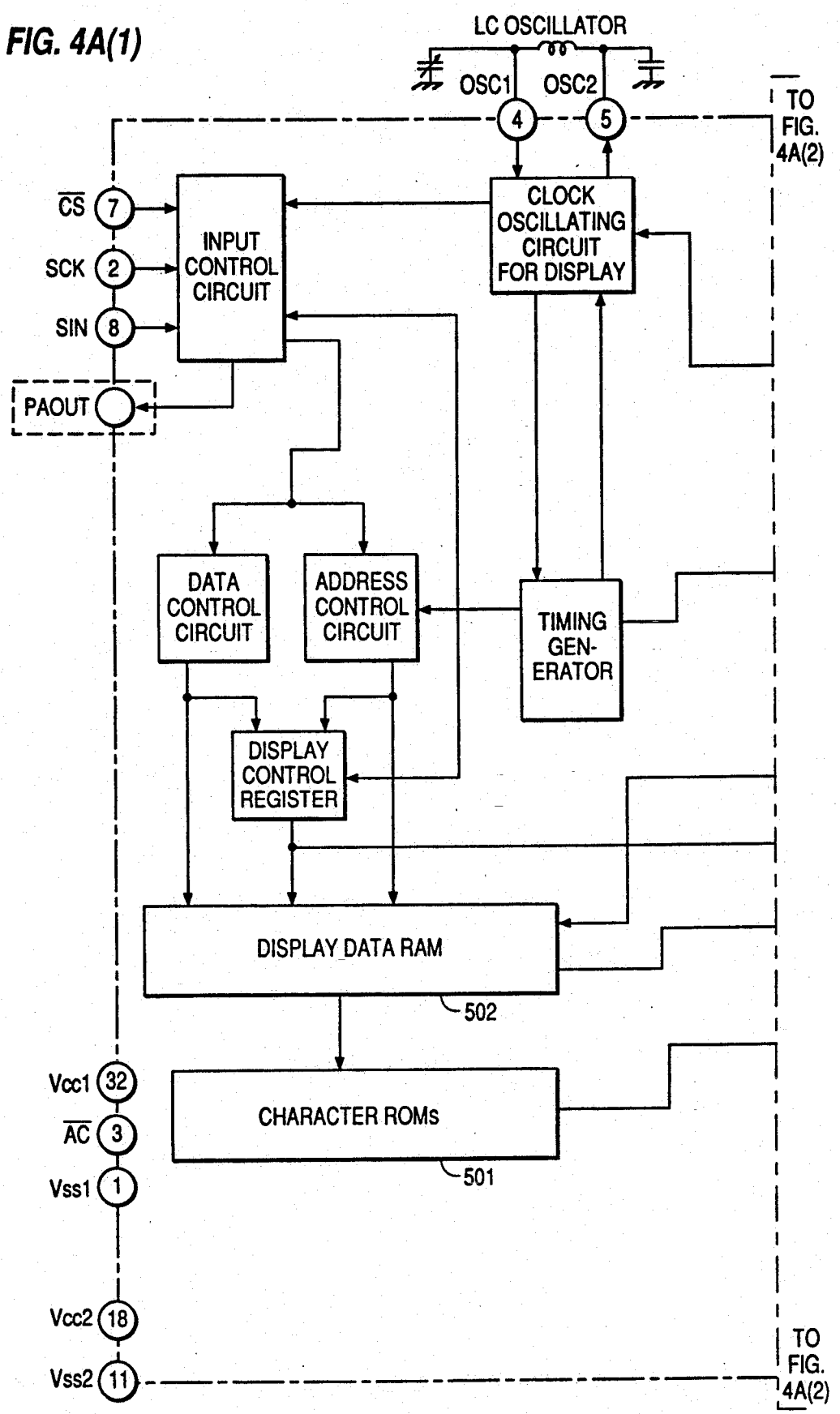
FIG. 4A(1)

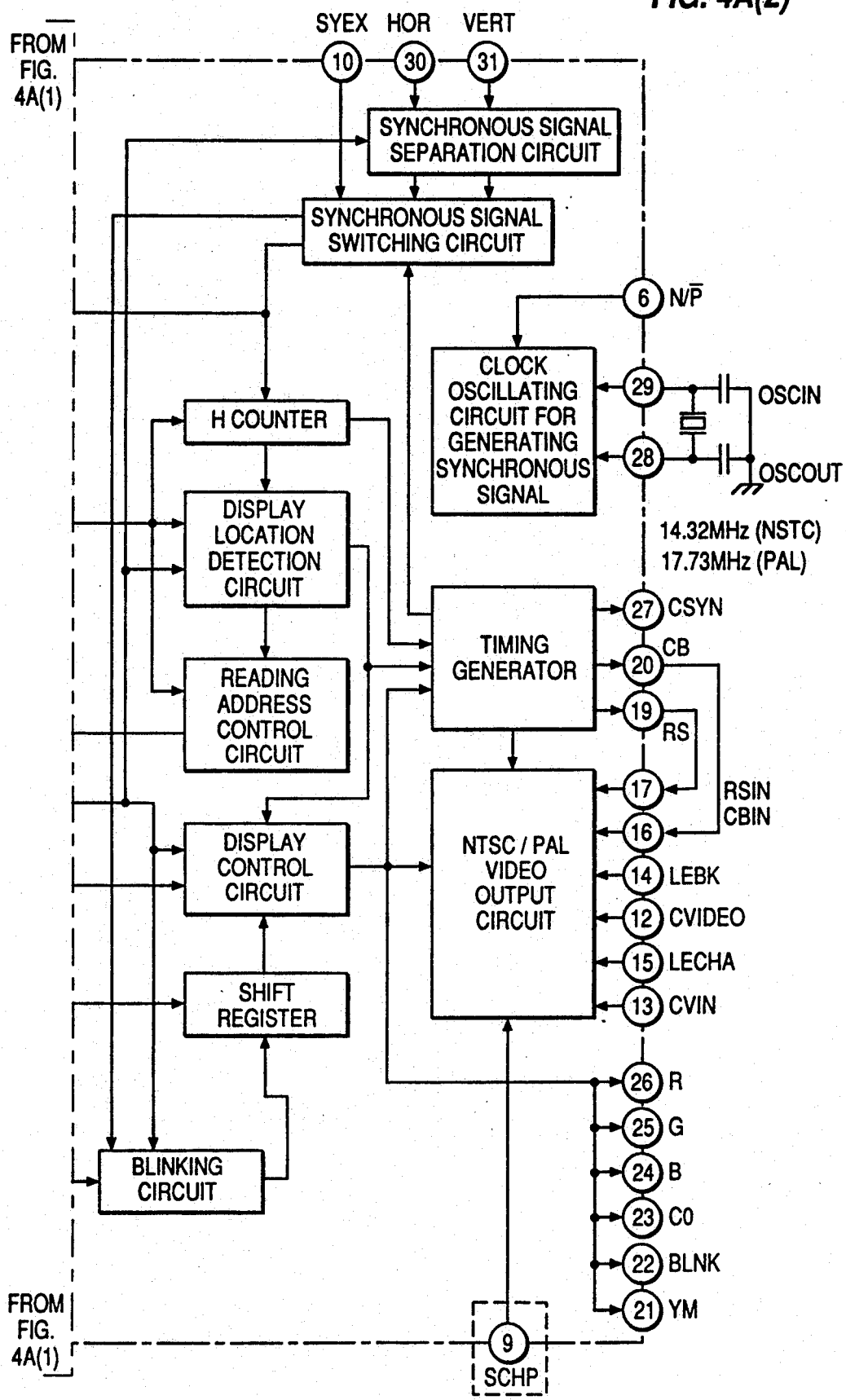
FIG. 4A(2)

FIG. 4B

| CHARACTER COLOR BITS | BLINKING BIT | CHARACTER CODE |
|---|---|---|

FIG. 6

| ID | COND. 1 | COND. 2 | COND. 3 | COND. 4 | COND. 5 | COND. 6 | COND. 7 | COND. 8 | COND. 9 | COND. 10 |
|---|---|---|---|---|---|---|---|---|---|---|

| BACKGROUND COLOR | BARKER LOCATION | DISPLAY NUMBER | FINAL TUNE CHANNEL |
|---|---|---|---|

FIG. 4C

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 | 163 | 164 | 165 | 166 | 167 | 168 |
| 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 | 235 | 236 | 237 | 238 | 239 | 240 |

| DISPLAY NUMBER | SCREEN NUMBER | LAST SCREEN FLAG | SEQUENCE NUMBER | CHARACTERS |
|---|---|---|---|---|

FIG. 5A

| ID | ON SCREEN ALERT DATA | DISPLAY NUMBER | BACKGROUND COLOR | TUNING DATA | MESSAGE EXPIRATION | ADDRESS DATA |
|---|---|---|---|---|---|---|

FIG. 5B

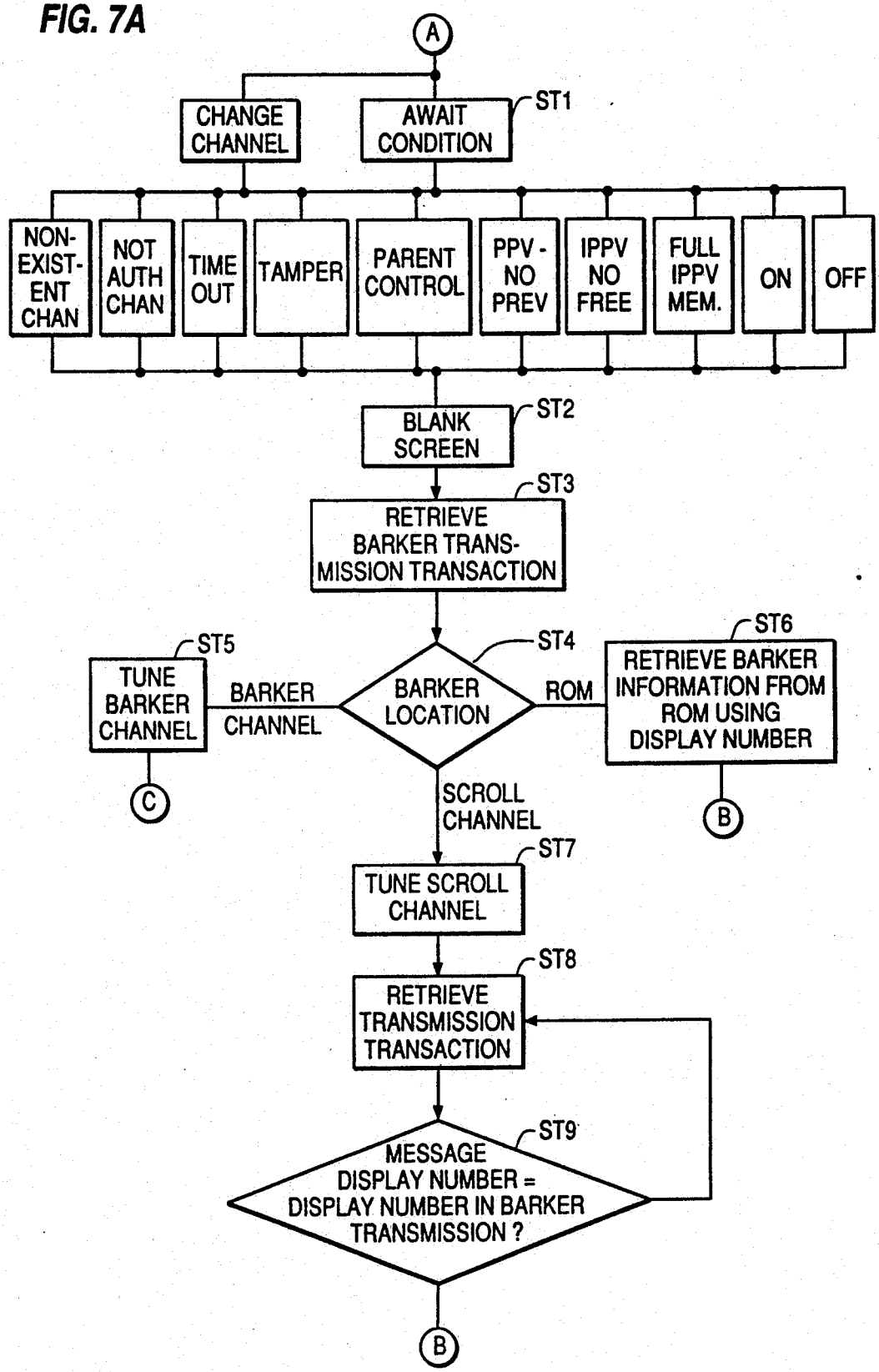

METHOD AND APPARATUS FOR TUNING DATA CHANNELS IN A SUBSCRIPTION TELEVISION SYSTEM HAVING IN-BAND DATA TRANSMISSIONS

TECHNICAL FIELD

The present invention generally relates to a subscription television system having in-band data transmissions and, more particularly, to a method and apparatus for tuning channels in a subscription television system having in-band data transmissions.

BACKGROUND OF THE INVENTION

The present invention is directed to cable television systems wherein video signals are sent from a headend to individual subscriber terminals. As is well-known in the art, various levels of service are available to the subscriber terminals. Subscribers may choose from a wide variety of programs offered by a cable television system. Since a cable television system may provide many different programs, it is important to know which programs each individual subscriber terminal is authorized to receive. Additionally, it is necessary to send other information from the headend to a subscriber terminal for various other reasons, as is well known in the art.

One type of system for accomplishing these goals is a system using in-band data transmissions. Known in-band systems send authorization information and other information from the headend to the subscriber terminals over the same channel that is used to transmit video information. Such information may be sent on an addressable basis. One problem encountered with in-band systems is that in order for a subscriber terminal to receive information from a headend or other source, the video channel to which it is tuned must contain the data. Therefore, if information is sent out from a headend to all the subscriber terminals, only those terminals that are tuned to the appropriate frequency or channel will receive that information at that time. That gives rise to the need for providing refresh data, i.e., it is necessary to repetitively send out these data messages to ensure that all subscriber terminals will receive them.

SUMMARY OF THE INVENTION

Accordingly, it is an object of the present invention to provide an improved method and apparatus for tuning a data channel in an in-band subscription television system.

It is another object of the present invention to provide a method and apparatus for instructing a subscriber terminal to tune a data channel in an in-band subscription television system.

In accordance with the present invention, a subscriber terminal apparatus is adapted to receive a television signal including video, audio, and data information. A tuner tunes channels of the television signal and an on-screen display control circuit selectively provides a display of characters on the television. A tuner control tunes the tuner to a channel having in-band data when characters are displayed on the television.

This capability addresses the problem with in-band systems that not all channels include data. Tuning a data channel while characters are displayed on a subscriber's television allows the subscriber to receive data. Additionally, the subscriber terminal may be selectively tuned to one of a number of data channels. Thus, based on a condition which caused the characters to be displayed, the subscriber terminal may be tuned to a data channel containing information for best addressing the condition in a rapid manner.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings.

FIGS. 4A-4C illustrate a barker transaction in accordance with the present invention.

FIG. 5A illustrates a message transaction transmission.

FIG. 5B illustrates a message definition transaction transmission.

FIG. 6 illustrates a barker transaction transmission.

FIGS. 7A and 7B are flow charts illustrating the present invention.

DETAILED DESCRIPTION OF THE PREFERRED EMBODIMENT

Figure 1:
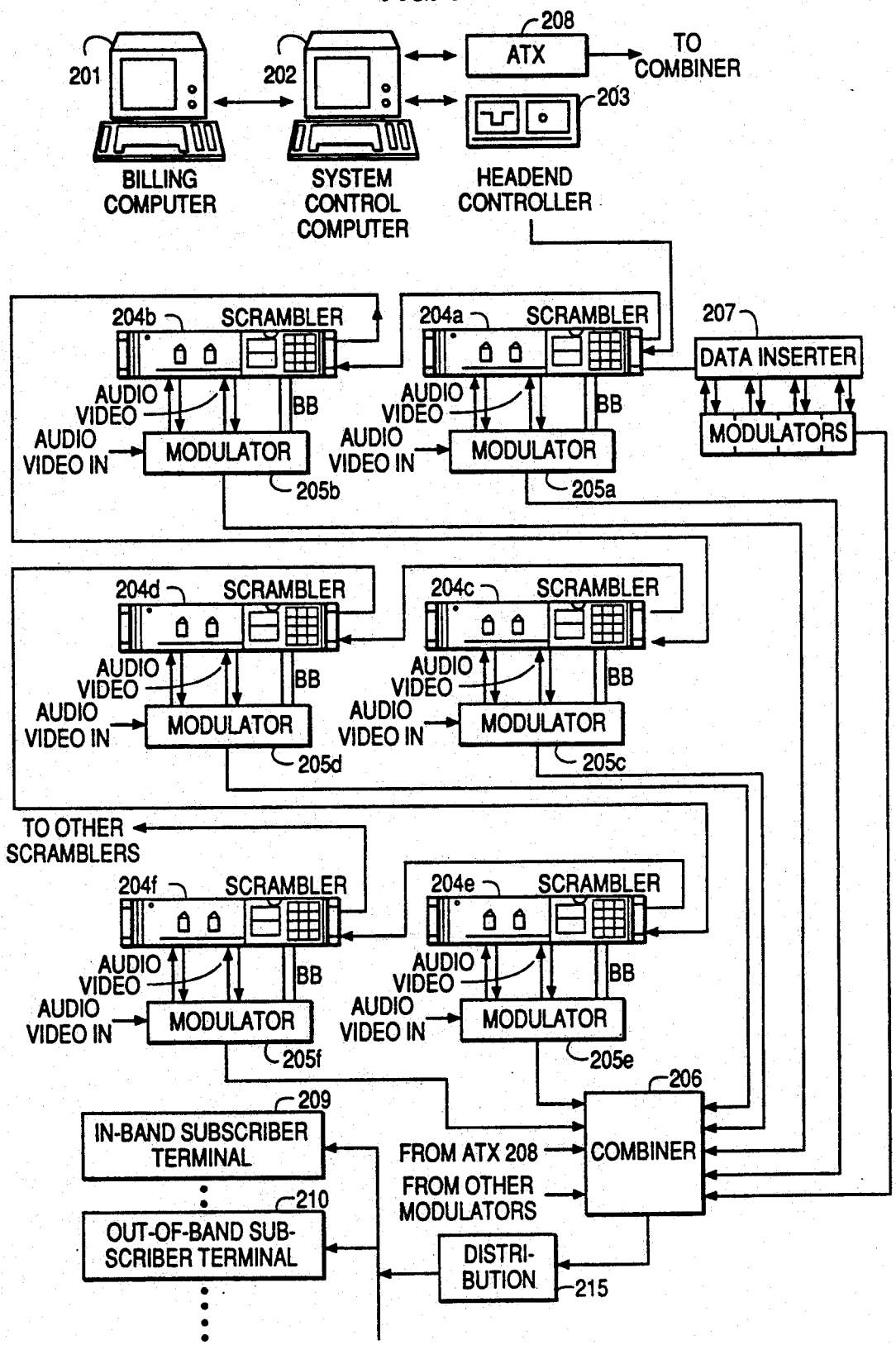
FIG. 1 is a block diagram of a headend for an in-band cable television system in accordance with the present invention.

FIG. 1 is a block diagram of a subscription television system in which the present invention may be implemented. Billing computer 201 includes a subscriber database and generates a monthly bill for the subscribers in the system based on level of service and any pay-per-view and impulse pay-per-view purchases. System control computer 202 such as an HP-1000 is interfaced to billing computer 201. System control computer 202 receives transactions such as authorization transactions from billing computer 201 and formats and forwards transactions to headend controller 203 and addressable transmitter (ATX) 208. System control computer 202 also generates system set-up parameters such as scrambled channels. System control computer 202 configures tuning frequencies of the channels provided to the subscribers and controls on-screen display as described in greater detail below. A system control computer interface is responsible for gathering and appropriately routing the data leaving the system control computer 202. Out-of-band data is sent to addressable transmitter 208 and in-band data is sent to headend controller 203.

Addressable transmitter 208 transmits data to out-of-band subscriber terminals via a dedicated FM data channel such as a 108.2 megahertz data channel in the cable television distribution system. This channel, known as the data carrier, is used to transmit both addressable commands intended for a particular out-of-band subscriber terminal and global commands intended for all out-of-band subscriber terminals in the system. Out-of-band subscriber terminals contain a receiver that is listening to the commands sent over this data channel. Unlike the in-band transactions described in detail below, out-of-band subscriber terminals receive data over this channel no matter what channel the subscriber terminal is tuned to.

Headend controller 203 is coupled to system control computer 202 and formats system control computer transactions for scramblers 204a-204f. Headend controller 203 stores all transactions and has the ability to perform continuous refreshes. The requirement to constantly, repetitively and efficiently transmit the information base arises since there is no permanently tuned data channel for in-band data transactions. Thus, all information flow to the in-band subscriber terminals is subject to the indeterminate availability of a data path to the in-band subscriber terminals. However, to further complicate matters, some of the information is real time critical, i.e. it may pertain to events that are currently in progress or it may be critical to maintenance or service changes. Other information, although less time critical in nature, may be of considerable value. Some information is pertinent only to certain of the data streams while certain information causes a write to nonvolatile memory in the in-band subscriber terminals and must be sent at minimal intervals.

Different groups of data are transmitted on a serial data channel from headend controller 203 to the scramblers 204a-204f. These data groups or data streams are: (1) OFF channel data, (2) barker channel data, (3) pay-per-view (PPV) channel data, (4) premium channel data, (5) scroll channel data, and (6) message channel data. Reference should be made to U.S. Pat. No. 5,058,160, incorporated herein, for details of data streams (1)-(4). Data streams (5) and (6) relate to the communication of message information from a system operator to subscribers and are discussed in greater detail in commonly assigned application Ser. No. 07/799,987 entitled "Method and Apparatus for Providing Message Information to Subscribers in a Cable Television System" filed Nov. 29, 1991 and incorporated herein by reference. Each data stream has a unique group address that is received only by scramblers having a matching address. For instance, premium channel data may have a group address of 01, and therefore all scramblers on premium channels should have a group address of 01. Headend controller 203 determines which data is output in each data stream. In an alternative embodiment, scroll channel data and message channel data may be provided to scramblers 204e and 204f on a spearate channel in order to maintain a high data rate for the information in data streams (1)-(4).

Scramblers 204a-204f are coupled to headend controller 203 and may be used to selectively scramble television signals for improved security in a subscription television system that is equipped with appropriate descramblers. The video, for example, may be scrambled in any manner known in the art including sync suppression and video inversion. For illustrative purposes only, it is assumed that scramblers 204a-204f respectively correspond only to data streams (1)-(6) identified above. The outputs of scramblers 204a-204f are respectively supplied to modulators 205a-205f. The outputs of modulators 205a-205f are supplied to combiner 206 which outputs a television signal for distribution over distribution system 215 to both in-band subscriber terminals 209 and out-of-band subscriber terminals 210. Data from scramblers, e.g., 204a can also be provided to data inserter 207 for the transmission of in-band data on non-scrambled channels.

Figure 2:
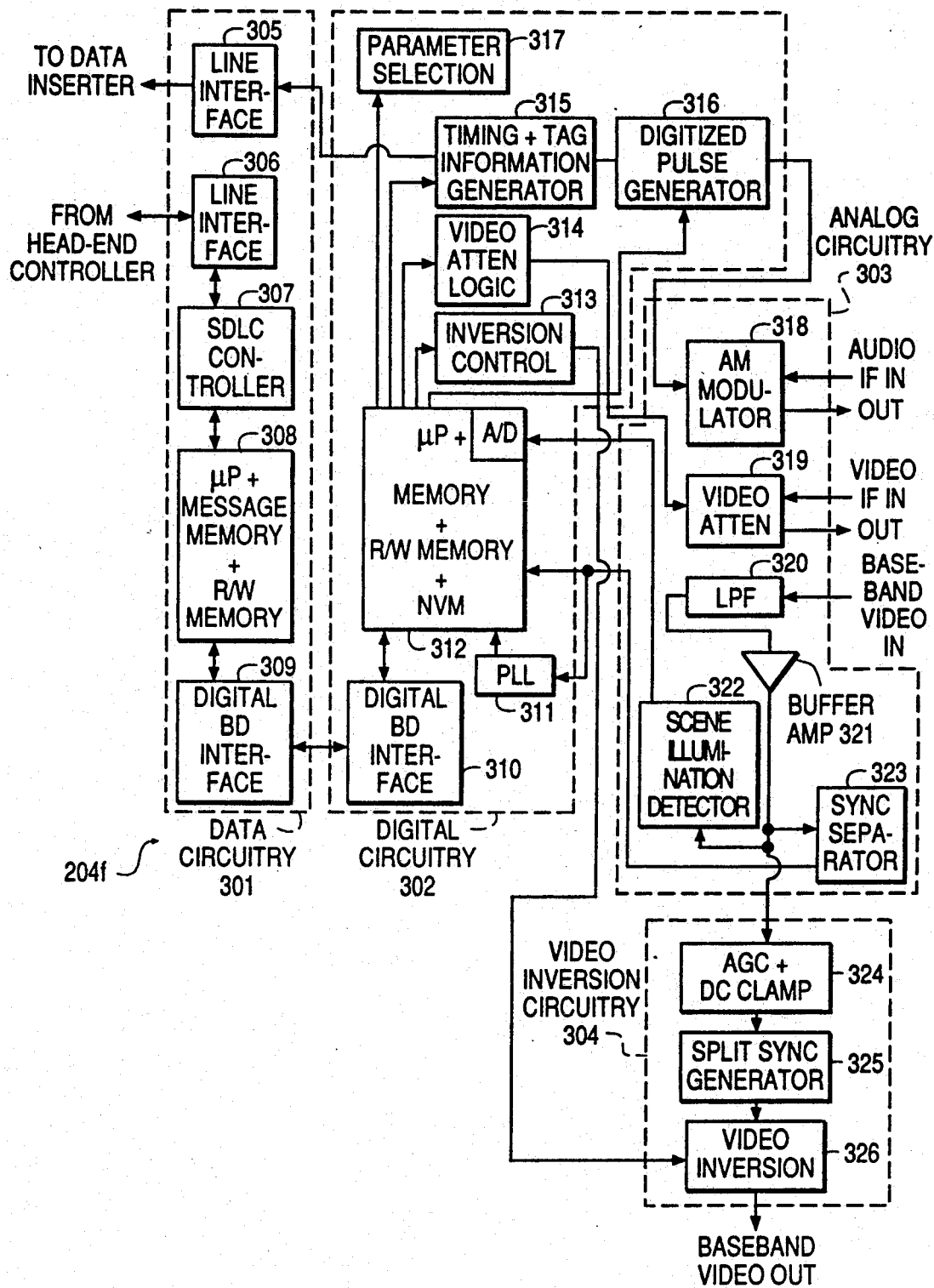
FIG. 2 is a block diagram of scrambler 204f shown in FIG. 1.

FIG. 2 is a block diagram of scrambler 204f shown in FIG. 1. Scrambler 204f receives message channel data from headend controller 203. The message channel data includes character information for display screens which may be addressed to one or more subscriber terminals for display on an associated television. Scrambler 204f includes data circuitry 301, digital circuitry 302, analog circuitry 303, and video inversion circuitry 304. Data circuitry 301 includes line interfaces 305 and 306, synchronous data link control (SDLC) 307, microprocessor 308, and digital circuit interface 309. SDLC 307 controls communication via line interface 306 between scrambler 204f and in band controller 203. Microprocessor 308 receives and processes information from SDLC 307. Information such as message information is stored in non-volatile message memory of microprocessor 308. To ensure sufficient memory for message data, there is preferably at least 128K of non-volatile message memory. Read/write memory of microprocessor 308 stores temporary information. Interface circuit 309 interfaces the data circuitry 301 to the digital circuitry 302.

Digital circuitry 302 includes interface circuit 310, phase locked loop 311, microprocessor 312, inversion control circuit 313, video attenuation logic 314, timing and tag information generator 315, digitized pulse generator 316, and parameter selection circuit 317. Interface circuit 310 interfaces digital circuitry 302 with data circuitry 301. Microprocessor 312 controls all essential functions and features of scrambler 204f. Microprocessor 312 extracts and processes message data from the data circuitry 301 and controls the scrambling modes of the system. Digitized pulse generator 316 generates the specific pulses placed on the sound carrier via the analog circuitry under the control of microprocessor 312. These data pulses represent authorization and control information, descrambling information including timing pulses, and message information. Microprocessor 312 is also coupled to parameter selection circuitry 317 which may be a front panel display and keyboard which permits an operator to select various modes of operation, e.g., scrambling.

Analog circuitry 303 includes AM modulator 318, video attenuation circuitry 319, low pass filter 320, buffer amplifier 321, scene illumination detector 322, and synchronization separator 323. AM modulator 318 modulates the pulses from pulse generator 316 onto an audio IF signal from modulator 205f and outputs the modulated signal to modulator 205f. Video attenuation circuitry 319 selectively provides sync suppression type scrambling and attenuates a video IF signal from modulator 205f under the control of video attenuation logic 314.

Baseband video input is filtered with low pass filter 320 which may be a sharp cut-off phase equalized low pass filter. Low pass filter 320 removes high frequency noise that can interfere with the baseband video. After filtering, the video is amplified back to its original level by video amplifier 321. Sync separator 323 extracts synchronization information which is then sent to microprocessor 312 to provide timing information such as composite and vertical sync and odd/even field indication. Scene illumination detector 322 determines the average luminance level of a scene, which level is supplied to an A/D converter of microprocessor 312. Microprocessor 312 uses this luminance information to detect scene changes in order to determine when scrambling modes may optimally be changed. The composite synchronization signal is supplied to the input of phase locked loop (PLL) 311. Phase locked loop 311 locks the system clock to the line rate.

The baseband video signal from amplifier 321 is also supplied to video inversion circuitry 304. Video inversion circuitry 304 includes automatic gain control (AGC) and DC clamping circuitry 324, split sync generator 325, and video inversion circuit 326. The AGC of circuit 324 adjusts the incoming signal to a predetermined value such as 1 V peak to peak. The DC clamping of circuitry 324 forces the bottom of the sync tip to be at ground. The output of circuitry 324 is supplied to a split synchronization circuit 325. The details of split synchronization circuitry is discussed in detail in commonly assigned U.S. Pat. No. 4,924,498, incorporated herein by reference. The output of split synchronization circuitry 325 is provided to inverting circuitry 326 for inverting the baseband video about an inversion axis. Inversion is controlled in accordance with signals from inversion control circuit 313.

Scrambler 204e receives scroll channel data from headend controller 203. The scroll channel data includes character information which defines barker screens which have been designed by the system operator on system control computer 202. Scrambler 204e is configured in the same manner as scrambler 204f but need not include a 128K memory. Rather, a 32K nonvolatile memory may be utilized. Scramblers 204e and 204f respectively store the scroll channel data and message channel data and continuously output the data on the corresponding scroll and message channels. Since the scroll channel data and the message channel data preferably define a plurality of barker and message screens, the stored data is output in a loop. thus, if there are 8 barker screens, the information for the first screen is followed by the information for the second screen and so on. When the information for the eighth screen is sent, it is followed by the information for the first screen. A similar loop is established for the message channel data. Details of scramblers 204a-204d may be found in the above-identified U.S. Pat. No. 5,058,160.

Figure 3:
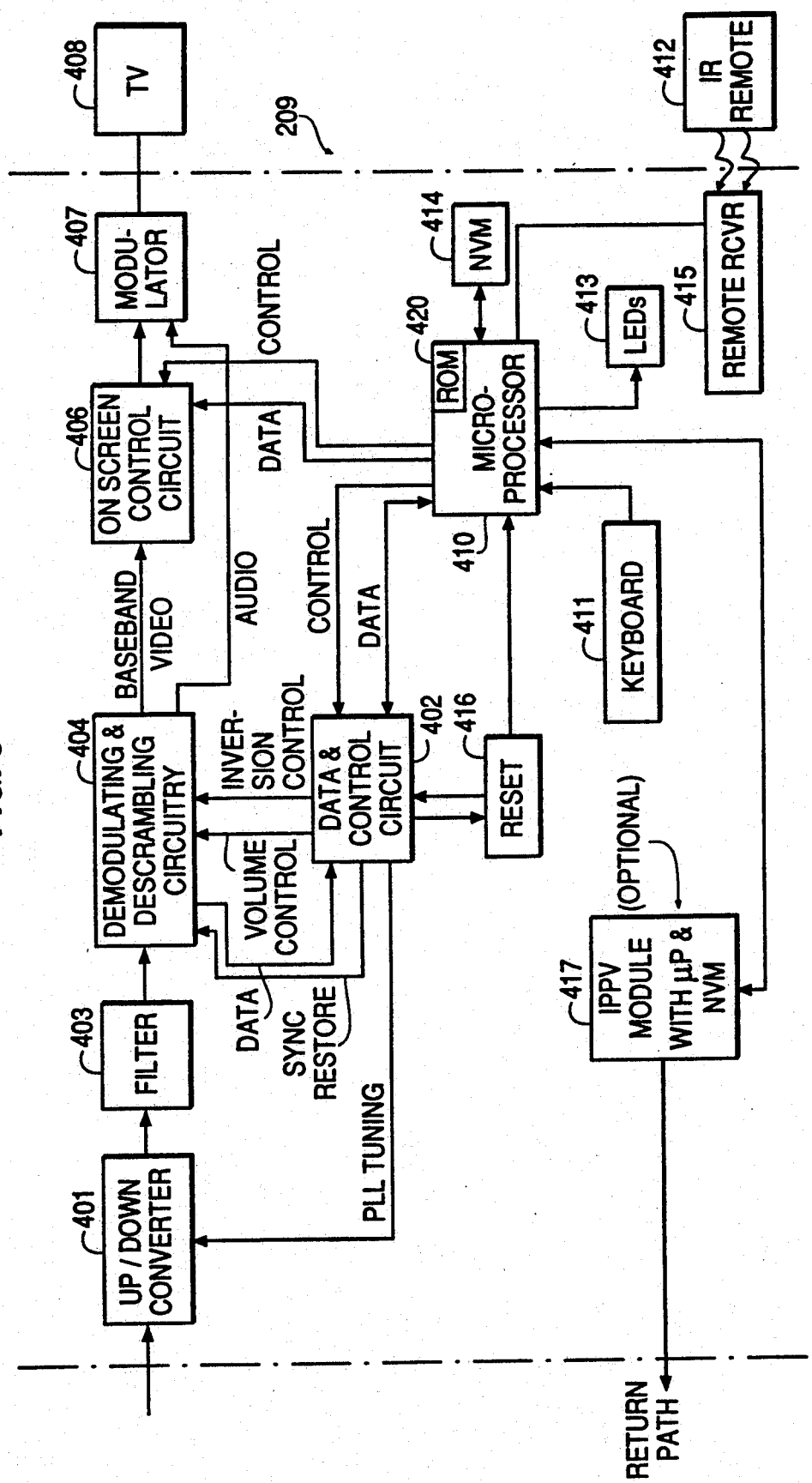
FIG. 3 is a block diagram of a baseband subscriber terminal in accordance with the present invention.

FIG. 3 is a block diagram illustrating the components of a subscriber terminal 209 in accordance with the present invention. Although the subscriber terminal is described below as a baseband subscriber terminal, it will be apparent that other subscriber terminals such as RF subscriber terminals may be utilized. The signal from distribution system 215 is supplied to up/down converter 401. Up/down converter 401 uses a phase locked loop under the control of data and control circuit 402 to convert a selected RF input signal to a 4.5 megahertz signal. Filter 403 such as a SAW filter filters the signal. Demodulating and descrambling circuitry 404 demodulates and descrambles the filtered signal under the control of data and control circuit 402. Demodulating and descrambling circuitry 404 also performs audio demodulation and pulse detection to recover the data modulated onto the audio carrier. The data is supplied to data and control circuit 402. Volume control of the audio is performed by the demodulating and descrambling circuit 404 under the control of data and control circuit 402 and microprocessor 410 as described in U.S. Pat. No. 5,054,071, incorporated herein by reference.

The output of demodulating and descrambling circuitry 404 is an unscrambled baseband video signal which is supplied to on-screen display control circuit 406. On-screen display control circuit 406 is preferably a Mitsubishi M50556 on-screen display controller. On-screen display control circuit 406 selectively generates on-screen character displays in place of or overlaid on the video signal. Modulator 407 converts the signal containing the video, audio, and/or characters from display control 406 on channel 3/4 which is supplied to television 408.

Microprocessor 410 controls the overall operation of subscriber terminal 209. Keyboard 411 on a front panel of the subscriber terminal generates subscriber supplied signals for channel tuning, volume level, and the like which are supplied to microprocessor 410. Remote receiver 415 receives commands from IR remote 412, as is well known in the art, and provides the commands to microprocessor 410. Reset circuitry 416 resets microprocessor 410 and/or data and control circuit 402 to ensure proper operation of the system if there have been power failures, power surges, and the like. When keyboard 411 or IR remote 412 is utilized to select a channel, microprocessor 410 instructs data and control circuit 402 to appropriately control up/down converter 401 to tune the selected channel. Data and control circuit 402 utilizes recovered descrambling data to generate appropriate control signals, e.g. inversion control and sync restore signals for descrambling the input television signal. Microprocessor 410 determines whether data and control circuit 402 carries out descrambling on the basis of authorizations downloaded through the in-band data system from system control computer 202. LED display 413 displays channel numbers and diagnostics. NVM 414 stores data, e.g., authorizations, terminal configurations. Subscriber terminal 209 may optionally include IPPV module 417. Module 417 allows the subscriber to authorize his or her subscriber terminal to receive a pay-per-view event, store the data associated with the purchase of that event in non-volatile memory, and transmit the data to the system operator via a telephone return path or an RF return path. The subscriber is then billed for the purchased events.

FIG. 4A is a block diagram of the Mitsubishi M50456 on-screen display control circuit. The on-screen display control includes character ROM 501 for storing a character set. In a preferred embodiment, the following sixty-four characters are stored in character ROM 501:
blank
capital letters A-Z
cursor—icon
numbers 0-9
blank volume level
four volume level bars
£ (Pound Sterling)
[ ] ▲ ▼ ? - : $ ' , . * # & ■ +
single character Am Pm Ch
Display RAM 502 is set with data from microprocessor 410 via serial input $S_{IN}$ to generate on screen displays using these sixty-four characters. This data may be provided from a number of sources. A first source is message data from message channel data scrambler 204f. A second source is scroll channel data from scroll channel data scrambler 204e. A third source is barker data from ROM 420 of subscriber terminal microprocessor 410. Another source of display information is menu screen information stored in microprocessor ROM 420. The use of such menu screens is described in greater detail in commonly assigned application Ser. No. 07/800,836 entitled "Method and Apparatus for Providing an On-Screen User Interface for a Subscription Television Terminal", incorporated herein by reference. Display RAM 502 includes 240 memory locations for characters to be displayed on television 408. As shown in FIG. 4B, each memory location includes a blinking bit which determines whether the character is blinking, character color bits which determine the color of the character, and a character code identifying one of the characters stored in ROM 501. The configuration of the on-screen display is shown in FIG. 4C and can be seen to consist of ten rows of twenty four characters each. The information in display RAM 502 determines what appears at each of the screen positions 1-240.

There are three modes of on-screen display control circuit. The first mode simply provides the video of a selected channel. The second mode is a video overlay mode in which character information is overlaid on the video of a selected channel. The second mode may used for example to display time, channel number, and channel identification information when a subscriber tunes to different channels. Channel identification information is described in commonly assigned copending application Ser. No. 07/800,002 entitled "Method and Apparatus for Displaying Channel Identification Information", filed Nov. 29, 1991 and incorporated herein by reference. The third mode is a character mode in which character information is presented on a plain background. This mode is preferably used for messages, for example.

Addressable message transaction transmissions for on-screen display may be forwarded to subscriber terminals in the cable system using message scrambler 204f. FIG. 5A illustrates a message transaction transmission for forwarding characters to subscriber terminals. Each message transaction transmission has a display number field associated therewith for identifying a message. In accordance with a present embodiment, the display numbers may range from 0 to 65535, although the invention is not limited in this respect. Additionally, a subset of the display numbers, for example from 0 to 7, are reserved for barker text downloaded by scroll channel scrambler 204e as discussed in greater detail below. Each message may include up to sixteen screens, each screen having 240 characters. The characters for each screen are sent in up to eleven sequenced transaction transmissions such as illustrated in FIG. 5A. A sequence number field identifies the transaction transmissions in the sequence of transaction transmissions. The transaction transmissions also include a screen number field for identifying the screens in a sequence of screens and a last screen flag for identifying the last screen in a sequence. If the message is less than 240 characters and message scrambler 204f is configured to transmit variable length messages, fewer transaction transmissions need to be sent to complete the message. The message transaction transmission shown in FIG. 5A may then also include a last transaction flag. As discussed in U.S. Pat. No. 5,058,160, the rate at which transactions are sent is 29 transactions per second. At this transaction rate, slightly more than 3 seconds is required to send eight 240 character messages over the same message channel. Accordingly, the average wait to start receiving one of these messages is approximately 1.5 seconds.

The message channel utilizes a scrambler configured as scrambler 204f with internal data RAM which stores the message loop from headend controller 203 and retransmits it constantly to the subscriber terminals under the control of microprocessor 312. The serial nature of the system is such that as the number of messages in the message loop increases, the response time for a subscriber to receive a message increases. Additional message channels may be utilized to speed up the response time.

The message transaction may also include data to instruct on-screen display control circuit 406 to blank the display on television 408 until the entire message transaction is received and ready for display. Alternatively, on-screen display control circuit 406 may display the characters as they are received until the message is completed.

A message definition transaction transmission is depicted in FIG. 5B. An ID field identifies this transaction transmission as a message definition. This transaction transmission indicates that a message has been sent to the subscriber terminal. The messages may be individually addressed or addressed to members of a group of subscriber terminals defined by the address data. Using a separate downloaded transaction, a subscriber terminal can be assigned to one or more groups. In a preferred embodiment, 64 groups are defined, but the invention is not limited in this respect. The message definition transaction transmission includes a background color field for setting the background color of the on-screen display and a tuning field which instructs the terminal which data channel to tune to receive the message, which in this example, is the message channel. When a subscriber terminal receives a message definition transaction transmission which is addressed to it or to any group of which it is a member, a message alert may be provided in accordance with the alert data field. The subscriber may view the message by use of a menu structure described in the above-mentioned commonly assigned application entitled "Method and Apparatus for Providing an On-Screen User Interface for a Subscription Television Terminal". In order to obtain the message, data and control circuit 402 of the subscriber terminal tunes up/down converter 401 to the channel defined by the tuning field and searches for a message transaction transmission with the same display number as in the message definition transaction transmission. In a preferred embodiment, the tuning data instructs the subscriber terminal to tune either the channel currently tuned, one of the message channels, the scroll channel, or the OFF channel to retrieve the appropriate message. The message definition transaction transmission of FIG. 5B is preferably sent on all data streams output by headend controller 203 in order to most quickly inform a subscriber that he or she has a message.

As noted above, a subset of the message transactions may be used for barkers, i.e., message transaction transmissions having display numbers of 0-7 associated therewith. It is desirable that a system operator provide specific information to a subscriber concerning, for example, his inability to view a particular channel. Such specific information promotes a user friendly interface with the subscriber. A number of conditions exist for which such barkers are useful. Barkers may be provided if a subscriber terminal:

1. is OFF
2. is tuned to a non-existent channel
3. is not authorized for a channel
3. has timed-out, i.e., has been disconnected from the cable for longer than a predetermined period of time
4. has been tampered with
5. tunes a parentally controlled channel
6. tunes a pay-per-view channel without a preview
8. tunes an IPPV channel with no free time
9. has a full IPPV event memory
10. is turned ON One method of providing barkers to subscribers is through the use of downloaded text barkers using the scroll channel output of scrambler 204e. The scroll channel is a dedicated data channel of any particular video channel which only sends transactions that define text barkers. These downloaded text barkers are defined by system control computer 202 and forwarded to the subscriber terminals. Each text barker may include up to 16 pages, each page including 240 characters. Although barkers are a subset of messages utilizing a predetermined range of display numbers, they are preferably transmitted on the separate scroll channel so that other data streams, including message data, are not affected.

A barker transaction transmission is illustrated in FIG. 6. The transaction transmission includes an identification identifying it as a barker transaction transmission and information regarding each of the barker conditions specified above. For each condition, the transaction transmission includes a background color field for setting the background color on which the barker information is presented. The information may be presented on one of a number of different solid colors such as low intensity blue, high intensity blue, black, green, blue, red, and magenta. Alternatively, the information may be overlaid onto the video information. The transaction transmission includes a field identifying where the appropriate barker information may be found. The information may be found on a six megahertz video channel, the scroll channel, or in the read only memory 420 of microprocessor 410, as set forth in greater detail in commonly assigned application Ser. No. 07/799,987 entitled "Method and Apparatus for Providing Message Information to Subscribers in a Cable Television System". The transaction transmission also includes the display number for the barker screen or screens as discussed above.

Figure 7B:
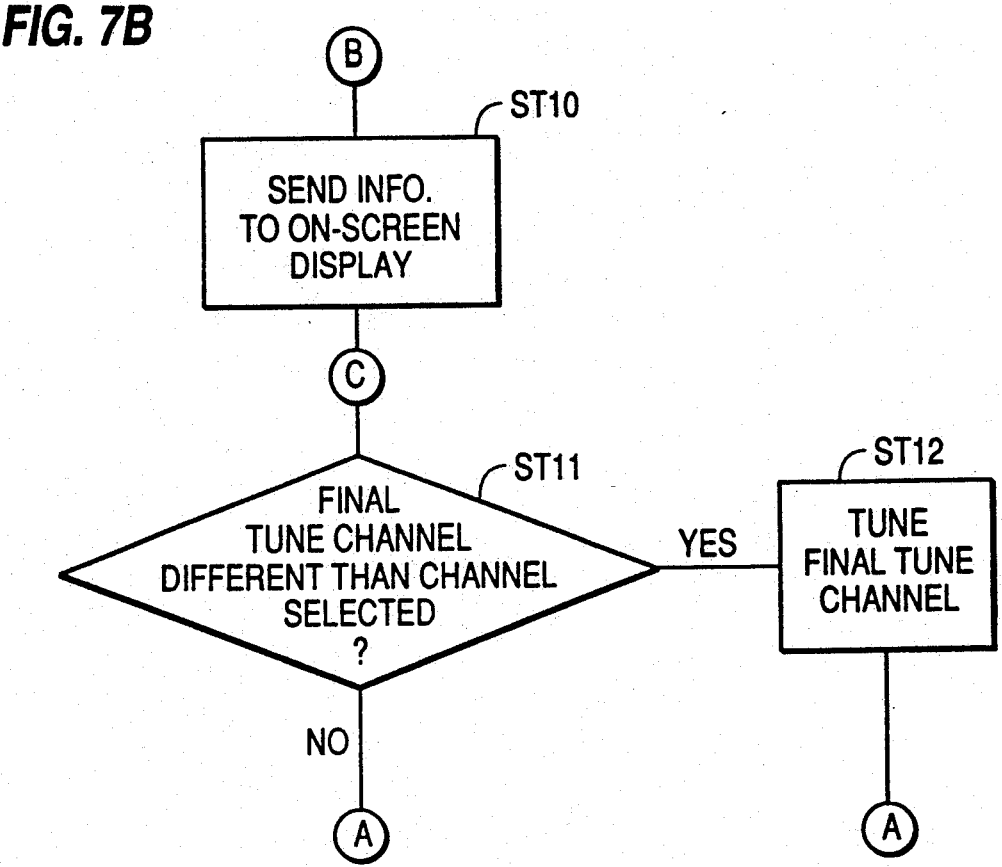

The present invention will be discussed with reference to FIGS. 7A and 7B. Upon the occurrence of one of the barker conditions identified above, the television is blanked (ST2) and a barker transmission transaction as shown in FIG. 6 is retrieved (ST3). As noted above, this barker transaction transmission defines: (1) where the barker information may be found; (2) the background color for the on-screen display; (3) the display number; and (4) the final tune channel.

The location of the video barker information is determined (ST4). If the information is found on a six megahertz video barker channel, this video barker channel is tuned (ST5) until a new channel is selected or a new condition occurs. If the barker information is found in ROM 420 of microprocessor 410, the appropriate information is retrieved from ROM 420 using the display number (ST6) and the information is supplied to on-screen display control 406. If the barker information is found on the scroll channel, the scroll channel is tuned (ST7) and the transaction transmissions on the scroll channel are retrieved (ST8) until a match is found (ST9) between the retrieved display number and the display number determined at ST3. When this is done the appropriate information is supplied to on-screen display control 406 (ST10). Next, it is determined (ST11) whether the selected channel is different than the final tune channel as determined at ST3. If so, the final tune channel is tuned (ST12).

Thus, once the barker character information has been retrieved from either the scroll channel or ROM and for as long as the subscriber does not change the selected channel or another barker condition does not occur, up/down converter 401 may be tuned to any channel since on-screen display control 406 controls the television to display a solid background of the appropriate color no matter what video is input. Thus, the barker transaction of FIG. 6 includes final tuning instructions. These instructions may instruct the microprocessor 410 to control data and control circuit 402 to final tune the selected channel, the video barker, the scroll channel, the OFF channel, or some other channel containing in-band data transmissions. The OFF channel is the channel to which the subscriber terminal is tuned when it is OFF. Accordingly, while the barker is displayed, the subscriber terminal may be receiving data from the final tuned channel. The significance of this capability is related to one of the problems with in-band systems described above, namely, that not all channels include data. Thus, no data is received unless the subscriber terminal is tuned to a data channel. Final tuning while a barker is displayed tunes the subscriber to a data channel so that it may receive data. The final tuned channel remains tuned until the subscriber selects a different channel via the keyboard or IR remote or the terminal is switched OFF. Of course, if the final tuned channel is the OFF channel and the terminal is switched OFF, the terminal may remain tuned to the OFF channel.

Final tuning is particularly beneficial if, for example, a pay-per-view type barker is being viewed. Thus, it may be that the subscriber is awaiting authorization for some event. Thus, the barker transaction may instruct microprocessor 410 to control data and control circuit 202 to set up/down converter 201 to the data channel having fast-poll pay-per-view authorization data after the appropriate barker character information is obtained from microprocessor ROM or the scroll channel. This allows a subscriber to quickly obtain authorization information. By instructing the subscriber terminal to tune a particular data channel upon the viewing of a particular barker, the system operator can connect the subscriber terminal to a data channel most likely to quickly provide data such as authorizations. Thus, the barker transaction includes two tuning instructions. The first instructs the subscriber terminal to tune to where the barker information may be found. The second instructs the subscriber terminal to final tune where other information may be found.

It should be noted that if a six megahertz video barker channel is utilized to present barker information, it is preferable that the final tuned channel be video barker channel.

Finally, examples of barkers are set forth with respect to FIG. 8. An OFF barker such as illustrated in FIG. 8A may be presented when the subscriber terminal is OFF. Since the subscriber terminal is OFF, the OFF barker is simply a blank screen. As discussed in greater detail in the above-identified U.S. Pat. No. 5,058,160, when a subscriber terminal is switched OFF, an OFF channel is tuned for the purpose of receiving in-band data.

Figure 8A:
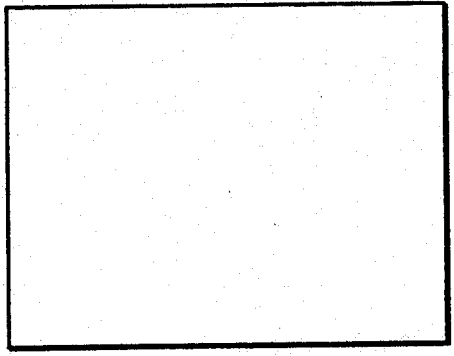
FIGS. 8A-8J illustrate various barkers.
Figure 8B:
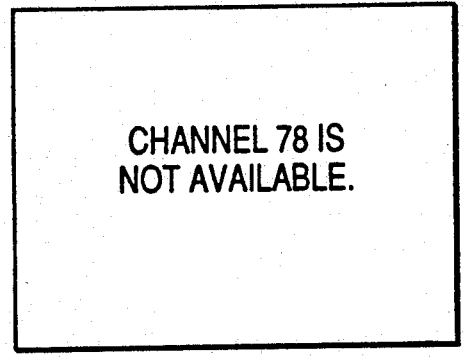

An INVALID CHANNEL barker such as illustrated in FIG. 8B may be presented when a subscriber selects a channel which does not appear in the cable system. Thus, a subscriber is informed that a particular channel is not available.

Figure 8C:
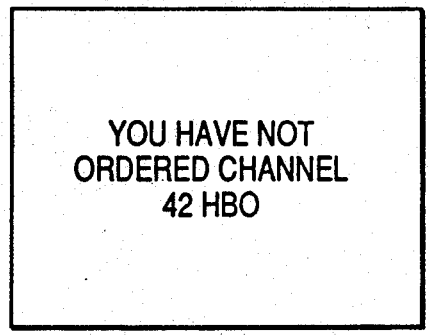

A NOT AUTHORIZED barker such as illustrated in FIG. 8C may be presented when a subscriber selects a channel having a premium service which the subscriber has not ordered. Thus, a subscriber is informed that he or she has not ordered a particular channel. It is noted that this barker uses the channel identification information HBO which is described in greater detail the the above-referenced commonly assigned application.

Figure 8D:
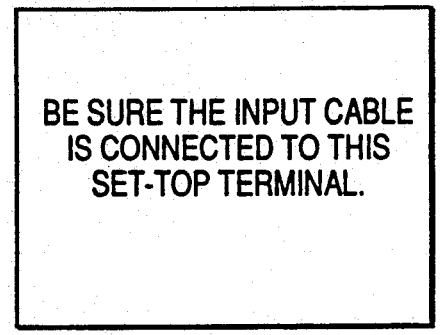

A TIME-OUT barker such as illustrated in FIG. 8D may be presented if the subscriber terminal does not periodically receive a refresh signal transmitted from the headend. The refresh period is globally controlled by the headend. Thus, a subscriber is informed that he or she should check the connection of the input cable to the terminal in order to ensure proper operation.

Figure 8E:
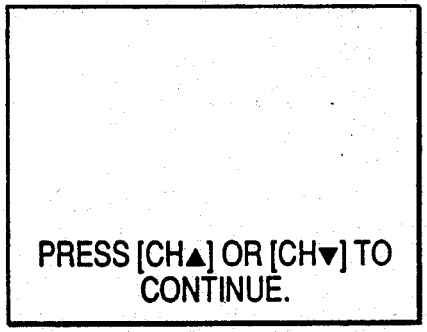

A TURN-ON barker such as illustrated in FIG. 8E may be presented every time a subscriber terminal is switched ON. The barker is cleared when the subscriber changes the channel.

Figure 8F:
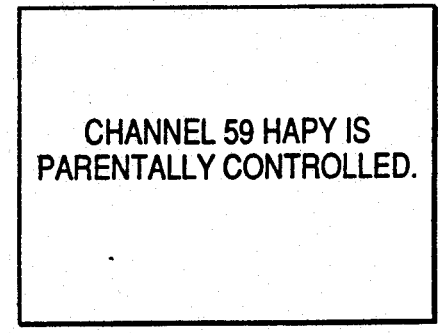

A PARENTAL CONTROL barker such as shown in FIG. 8F may be presented when a subscriber selects a channel which is under parental control. This barker is cleared when parental control of the channel is released such as by entry of an appropriate parental code number. Thus, a subscriber is informed that a particular channel is under parental control. It is noted that this barker uses the channel identification information HAPY which is described in greater detail the the above-referenced commonly assigned application.

Figure 8G:

A TAMPER barker such as illustrated in FIG. 8G may be presented when the microprocessor of the subscriber terminal detects tampering. As can be seen, this barker is blank.

Figure 8H:
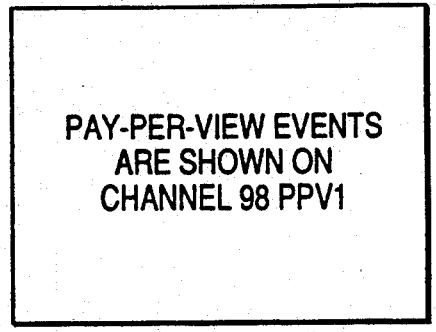

The PPV barker such as illustrated in FIG. 8H may be presented when a subscriber selects a channel showing a pay-per-view event and no preview time is remains or has been provided. If the user calls and buys the event, the headend will authorize the subscriber terminal and the event may be viewed. This barker may also be presented when an IPPV channel is selected and and an event is not purchasable, i.e., it is outside the purchase window. Thus, a subscriber is informed that a particular channel may not be viewed since it contains pay-per-view or impulse pay-per-view events. It is noted that this barker uses the channel identification information PPV1 which is described in greater detail the the above-referenced commonly assigned application.

Figure 8I:
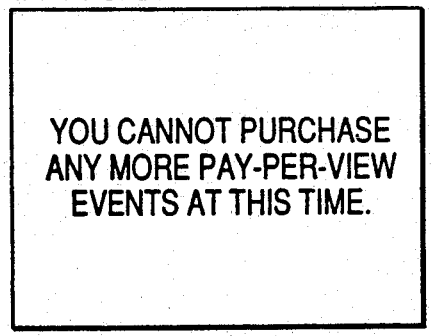

The IPPV-NO PURCHASE barker such as illustrated in FIG. 8I may be presented when a subscriber attempts to purchase an IPPV event and he or she is not permitted to make any additional purchases. This situation may arise, for example, when a subscriber has not paid for recent IPPV purchases or recent IPPV purchases have not been reported back to the billing computer. Thus, a subscriber is informed that he or she is unable to purchase any additional IPPV events.

Figure 8J:
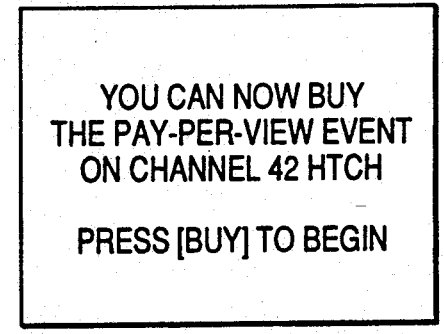

The IPPV HELP barker such as illustrated in FIG. 8J may be presented when the subscriber selects a channel showing an IPPV event wand the purchase window is still active. Thus, a subscriber is informed that he or she can purchase the event being shown on the selected channel. It is noted that this barker uses the channel identification information HTCH which is described in greater detail the the above-referenced commonly assigned application.

It will be apparent that the above-identified barkers are merely representative and the present invention is not limited in this respect.

It is to be understood that the invention is not limited to the illustrations described and shown herein which are deemed to be merely illustrative. The invention rather is intended to encompass all such modifications which are within its spirit and scope as defined by the appended claims.

We claim:

1. A subscriber terminal apparatus for use in an in-band television system in which inband information is transmitted within one or more channels, said subscriber terminal apparatus comprising:
    an apparatus input terminal for receiving a television signal comprising a plurality of channels including said one or more channels containing in-band information;
    an apparatus output terminal connectable to a television;
    a tuner for selectively tuning said channels;
    an on-screen display control circuit having a character memory for storing a character set, a first input terminal coupled to said tuner for receiving a video signal corresponding to a channel tuned by said tuner, a second input terminal for receiving character data for generating character screens using characters in said character set, an output terminal coupled to said apparatus output terminal, and a mode selection input responsive to mode selection data for selectively setting a first mode in which said video signal is output at said output terminal and a second mode in which a character screen on a solid background is output at said output terminal;
    processing means for determining an occurrence of one of a plurality conditions and for, in response to the occurrence, locating and retrieving character data and final tune data and supplying the character data and mode selection data to said on-screen display control circuit to set the second mode of said on-screen display control circuit and to generate a character screen, corresponding to the occurrence, on a solid background at said output terminal; and
    tuner control means, responsive to said processing means, for controlling said tuner to tune a final tune channel corresponding to the final tune data while said on-screen display control circuit is in the second mode.

2. The subscriber terminal apparatus according to claim 1, wherein said character data is located in a memory associated with said processing means.

3. The subscriber terminal apparatus according to claim 1, wherein said character data is located on one of said channels having in-band data.

4. The subscriber terminal apparatus according to claim 3, wherein said tuner control means tunes the channel having said charater data and tunes the final tune channel after said character data is retrieved.

5. The subscriber terminal apparatus according to claim 1, wherein said processing means, in response to the occurrence, further retrieves data for setting a background color for said character screen.

6. The subscriber terminal apparatus according to claim 1, wherein said character set comprises alphanumeric characters.

7. The subscriber terminal apparatus according to claim 1, wherein said character memory is a character ROM.

8. The subscriber terminal according to claim 1, wherein character data for a first character screen corresponding to a first occurrence is located in a memory of said processing means and character data for a second character screen corresponding to a second occurrence is located on a channel having in-band data.

* * * * *